United States Patent

Mishima et al.

Patent Number: 5,310,264
Date of Patent: May 10, 1994

[54] METHOD FOR IMPROVING THE TRANSIENT THERMAL PROPERTIES OF AIR-LUBRICATED HYDROSTATIC BEARINGS FOR THE MAIN SPINDLES OF PRECISION MACHINE TOOLS

[75] Inventors: Nozomu Mishima, Tsukuba; Kiyoshi Mizuhara, Tokyo; Yuichi Okazaki, Tsukuba; Norimitsu Ozawa, Tsuchiura, all of Japan

[73] Assignee: Agency of Industrial Science & Technology, Ministry of International Trade & Industry, Tokyo, Japan

[21] Appl. No.: 26,421

[22] Filed: Mar. 4, 1993

[30] Foreign Application Priority Data

Mar. 5, 1992 [JP] Japan .................................. 4-83418

[51] Int. Cl.⁵ ............................................. F16C 29/04
[52] U.S. Cl. ................................. 384/100; 384/905
[58] Field of Search ............... 384/121, 905, 108, 109, 384/124, 278

[56] References Cited

U.S. PATENT DOCUMENTS

| | | | |
|---|---|---|---|
| 4,509,160 | 4/1985 | Eggers | 384/121 |
| 4,798,476 | 1/1989 | Sakatani et al. | 384/121 |
| 4,953,989 | 9/1990 | Hooykaas | 384/121 |
| 5,072,608 | 12/1991 | Lorett | 384/905 |

Primary Examiner—Lenard A. Footland
Attorney, Agent, or Firm—Oblon, Spivak, McClelland, Maier & Neustadt

[57] ABSTRACT

A method for improving the transient thermal properties of hydrostatic air main spindles for precision machine tools comprises the steps of installing an entire precision machine tool that has a main spindle with an air-lubricated hydrostatic bearing in a temperature-controlled constant-temperature environment, and raising the temperature of the lubricating air supplied to the air-lubricated hydrostatic bearing above the temperature of the constant-temperature environment until the thermal displacement of the main spindle reaches a target value, and thereafter lowering it below the temperature of the constant-temperature environment.

2 Claims, 2 Drawing Sheets

METHOD FOR IMPROVING THE TRANSIENT THERMAL PROPERTIES OF AIR-LUBRICATED HYDROSTATIC BEARINGS FOR THE MAIN SPINDLES OF PRECISION MACHINE TOOLS

BACKGROUND OF THE INVENTION

1. Field of the Invention

This invention relates to a method for improving the transient thermal properties of air-lubricated hydrostatic bearings for the main spindles of lathes, machining centers, turning centers, and other precision machine tools.

2. Prior Art Statement

In the prior art, when precision machining is performed with various types of precision machine tools, air-lubricated hydrostatic bearings are used for the main spindle bearings. The entire machine tool is installed within a constant-temperature chamber, and the air supplied to the spindle bearings is supplied at the same temperature as the temperature within the constant-temperature chamber. This method is used to homogenize the temperature distribution of the machine tool.

A main spindle lubricated by air in this manner innately has low friction, and the lubricating air will absorb and exhaust any heat generated, so very little thermal deformation would occur. However, when extremely high precision machining is performed, even thermal deformation on the order of several $\mu$m can adversely affect precision, thus requiring measures to reduce such thermal deformation.

In order to reduce this thermal deformation, the entire machine is externally cooled using oil, water, air or the like.

However, the method of external cooling of the entire machine tends to cool even unnecessary areas, requiring the addition of an inordinate amount of energy in comparison to the magnitude of the decrease in thermal displacement, thus degrading efficiency.

To solve this problem, the inventor of the present invention has proposed a method of reducing displacement by supplying the air spindle bearings with air of a temperature lower than the temperature within the constant-temperature chamber as lubricating air (Japanese Patent Application Public Disclosure No. 3(1991)-274737).

This newly proposed method can effectively reduce the absolute value of the thermal displacement in the steady state. However, this method requires a warm-up time of roughly 6–7 hours until the thermal displacement reaches the steady state, so a reduction in this warm-up time is desirable.

The present invention came about in light of the above, and its purpose is to provide a method for improving the transient thermal properties that can effectively reduce the absolute value of the thermal displacement in the steady state, and moreover, can shorten the warm-up time until the thermal displacement reaches a steady state.

SUMMARY OF THE INVENTION

The method of the present invention for improving the transient thermal properties of air-lubricated hydrostatic bearings for the main spindles of precision machine tools, intended to achieve this purpose, comprises the steps of installing an entire precision machine tool that has a main spindle with an air-lubricated hydrostatic bearing in a temperature-controlled constant-temperature environment, and raising the temperature of the lubricating air supplied to the air-lubricated hydrostatic bearing above the temperature of the constant-temperature environment until the thermal displacement of the main spindle reaches a previously-determined target value, and thereafter lowering it below the temperature of the constant-temperature environment.

As described above, by supplying the spindle bearing with lubricating air of a temperature higher than the constant-temperature environment, displacement in the spindle bearing increases rapidly. When this displacement reaches the target value, the temperature of the lubricating air supplied is reduced to below the temperature of the constant-temperature environment. This target value is a fixed temperature lower than room temperature, previously determined to be the ultimate value of the thermal displacement reached when air is supplied. By changing the temperature of the lubricating air as described above, the change in thermal displacement in the spindle bearing over time assumes an ideal shape, allowing the warm-up time to be shortened, simplifying the process of compensation by NC or the like.

These and other objects and features of the present invention will become more apparent from the following detailed description taken in conjunction with the accompanying drawings.

DESCRIPTION OF THE PREFERRED EMBODIMENTS

Figure 1:
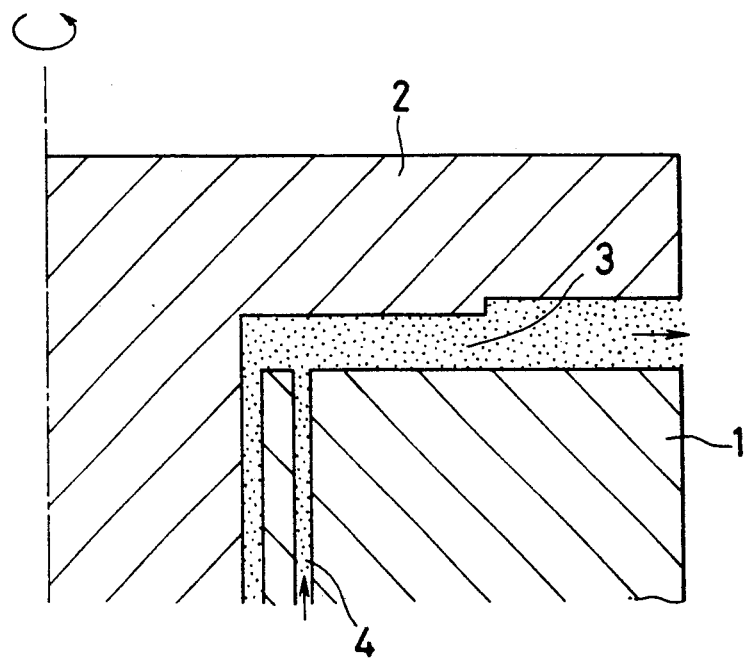
FIG. 1 is a cross-sectional diagram that shows the bearing structure of a main spindle with an air-lubricated hydrostatic bearing.

FIG. 1 shows an overview of the bearing structure of an air-lubricated hydrostatic bearing for the main spindles of precision machine tools that is subject to reduction of thermal deformation by means of the method of the present invention. A precision machine tool equipped with a main spindle incorporating this air-lubricated hydrostatic bearing is installed in a constant-temperature chamber or other constant-temperature environment maintained at a specific temperature (not shown).

The air-lubricated hydrostatic bearing main spindle in this precision machine tool is configured as a thrust-type high-speed main spindle, arranged such that a stator 1 supports a rotor 2 via a film of lubricating air 3. An air-supply channel is provided upon this stator 1 in order to supply lubricating air to the bearing section.

When the rotor 2 rotates, heat is generated due to the viscous friction of the lubricating air 3 within the bearing accompanying this rotation. In this case, if lubricating air of the same temperature as the set temperature within the constant-temperature chamber is supplied, as in conventional air lubrication methods, this heat conducts to the upper surface of the stator 1 and the lower surface of the rotor. Temperature differences arise with respect to other portions of the stator 1 and rotor 2 that are exposed to external air, and these temperature differences are the cause of thermal deformation of the main spindle.

For example, during long-term operation, thermal deformation on the order of several μm will normally occur.

According to the present invention, first, the steady-state thermal displacement of a bearing provided with lubricating air of a temperature 5° C.–10° C. below the setting temperature of the constant-temperature environment (hereafter called the steady-state temperature) is found experimentally or heuristically. This thermal displacement becomes the target value.

Next, lubricating air is supplied to the bearing together with the start of operation of the bearing. The temperature of the air supplied at this time is higher than the temperature within the constant-temperature environment. Since the purpose of supplying this higher-temperature air is to heat the bearing rapidly, its temperature is roughly 10° C. higher than the temperature of the constant-temperature environment. Accordingly, the bearing is heated by the supplied lubricating air, and its thermal displacement increases rapidly.

Once the thermal displacement reaches the target value set previously, the lubricating air is then supplied with its temperature at the steady-state temperature. Thereby, the thermal displacement of the bearing reaches the steady state.

Once the steady state is reached, lubricating air of a fixed temperature 5° C.–10° C. below the setting temperature of the constant-temperature chamber is supplied. Thereby, as heat is generated within the lubricating air and the temperature of the lubricating air rises, since it was originally of a lower temperature, this retards the development of temperature differences with other parts of the stator 1 and rotor 2 that are exposed to external air. This suppresses thermal deformation of the air-lubricated hydrostatic bearing main spindle, allowing the axial elongation of the main spindle due to heat to be greatly reduced in comparison to the normal case.

A preferred embodiment of this invention is given below.

A precision machine tool equipped with an air-lubricated hydrostatic bearing main spindle whose rotor rotates at a speed of 400 rpm is installed within a constant-temperature chamber with a temperature of 25° C.±0.3° C. Air is supplied to the air-lubricated hydrostatic bearing at a pressure of 4 kgf/cm².

First, 35° C. lubricating air is supplied for roughly 60 minutes after the start of operation of the main spindle, at which time the thermal displacement reaches the target value for thermal displacement of 2.0, and then 15° C. lubricating air is supplied. The state of the thermal displacement of the main spindle is as shown by curve a in FIG. 2, showing that it took roughly 80 minutes to halt the increase in thermal displacement and reach the steady state.

If the target value for thermal displacement is set to 1.5, 35° C. lubricating air is supplied for 40 minutes after the start of operation of the main spindle, at which time the thermal displacement reaches the target value for thermal displacement, and then 15° C. lubricating air is supplied. In this case, the thermal displacement of the main spindle is as shown by curve a in FIG. 2, showing that it took roughly 60 minutes to halt the increase in thermal displacement and reach the steady state.

Figure 3:
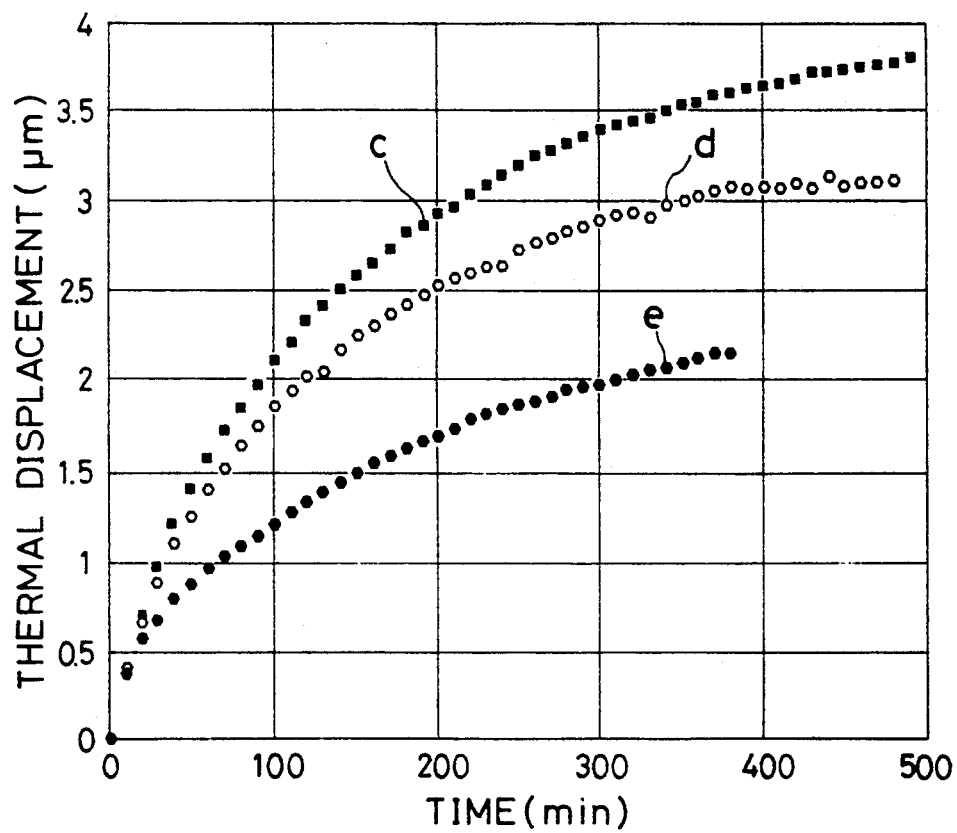
FIG. 3 is a graph showing the history of the thermal displacement of the bearing when the prior art is used.

For comparison, when lubricating air of a temperature the same or lower than the temperature of the constant-temperature environment is supplied as described in the prior art, the results of measuring the state of thermal displacement of the main spindle in this case are shown in the graph of FIG. 3. Curve c shows the case of when 25° C. lubricating air is supplied continuously from the start of operation of the main spindle. Curve d shows the case of when 20° C. lubricating air is supplied continuously from the start of operation of the main spindle. Curve e shows the case of when 15° C. lubricating air is supplied continuously from the start of operation of the main spindle.

Figure 2:
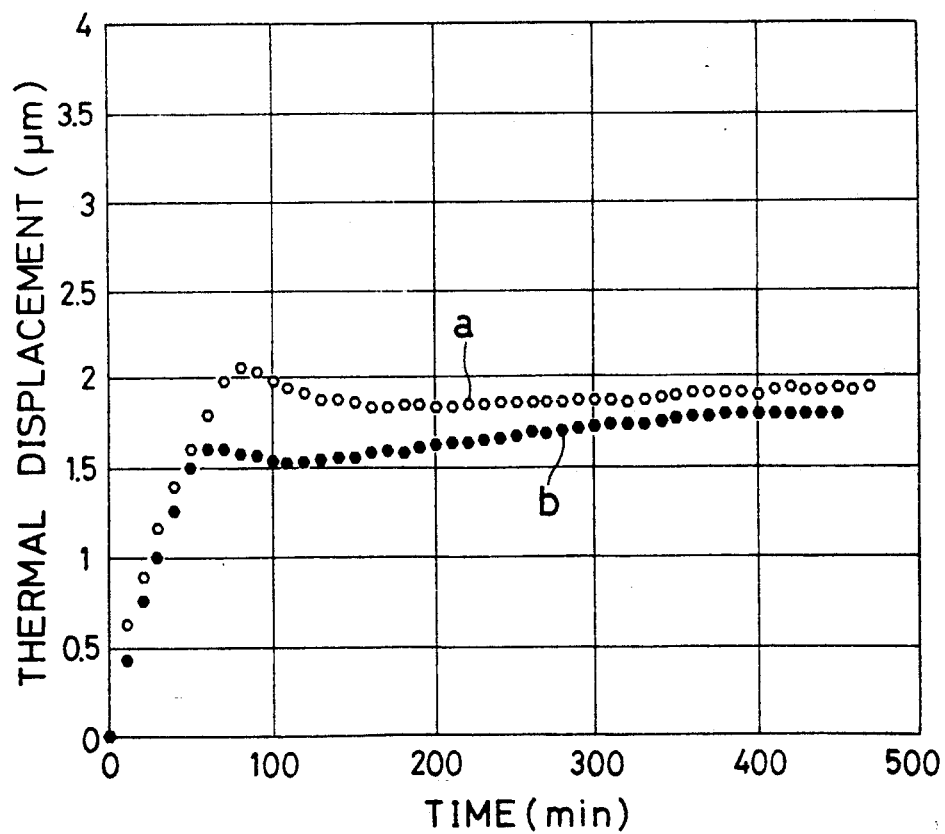
FIG. 2 is a graph showing the history of the thermal displacement of the bearing when the present invention is used.

As is evident from FIGS. 2 and 3, in contrast to the case of the present invention illustrated by curves a and b on FIG. 2, in which the increase in the thermal displacement of the main spindle was halted and the steady state was reached in roughly one hour, in the case of the prior art illustrated by curves c, d, and e on FIG. 3, this took roughly six hours.

It is thus evident that the present invention can greatly reduce the warm-up time.

Thus, by means of the present invention, a method for improving transient thermal properties can be implemented by which one can effectively reduce the absolute value of the thermal displacement of air-lubricated hydrostatic bearings in the steady state, and moreover, can markedly shorten the warm-up time until the thermal displacement reaches a steady state.

Obviously, numerous modifications and variations of the present invention are possible in light of the above teachings. It is therefore to be understood that within the scope of the appended claims, the invention may be practiced otherwise than as specifically described herein.

What is claimed is:

1. A method for improving the transient thermal properties of air-lubricated hydrostatic bearings for the main spindles of precision machine tools, comprising the steps of:
   installing an entire precision machine tool that has a main spindle with an air-lubricated hydrostatic bearing in a temperature-controlled constant-temperature environment, and
   supplying the air-lubricated hydrostatic bearing of said main spindle with lubricating air of a temperature higher than the temperature of said constant-temperature environment from the start of operation of said main spindle until the thermal displacement of said main spindle reaches a previously-determined target value, and
   once the thermal displacement of said main spindle reaches the target value, supplying the air-lubricated hydrostatic bearing of said main spindle with lubricating air of a temperature lower than the temperature of said constant-temperature environment.

2. The method for improving transient thermal properties of claim 1, in which the temperature of the lubricating air from the start of operation of said main spindle until the thermal displacement of said main spindle reaches a previously-determined target value is approximately 10° C. higher than said constant-temperature environment, and the temperature of the lubricating air after the thermal displacement of said main spindle reaches the target value is approximately 10° C. lower than said constant-temperature environment.

* * * * *